United States Patent
Lee et al.

(10) Patent No.: US 9,285,532 B2
(45) Date of Patent: Mar. 15, 2016

(54) BACKLIGHT MODULE HAVING A PRISIM REFLECTOR

(75) Inventors: Hsin Chin Lee, Waterloo (CA); Michael Lorne Purdy, Kitchener (CA); Choongho Lee, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/548,381

(22) Filed: Jul. 13, 2012

(65) Prior Publication Data
US 2014/0016354 A1    Jan. 16, 2014

(51) Int. Cl.
*F21V 7/04*     (2006.01)
*F21V 8/00*     (2006.01)

(52) U.S. Cl.
CPC ............ *G02B 6/0053* (2013.01); *G02B 6/0055* (2013.01)

(58) Field of Classification Search
CPC .............................. G02B 6/0053; G02B 6/0055
See application file for complete search history.

(56) References Cited

U.S. PATENT DOCUMENTS

| | | | |
|---|---|---|---|
| 7,927,003 B2 | 4/2011 | Chang | |
| 2006/0181897 A1* | 8/2006 | Ueno | G02B 6/0036 362/600 |
| 2006/0279216 A1* | 12/2006 | Kim et al. | 313/631 |
| 2007/0097296 A1* | 5/2007 | Li et al. | 349/114 |
| 2009/0303414 A1 | 12/2009 | Chung et al. | |
| 2010/0157623 A1* | 6/2010 | Tanahashi | 362/606 |
| 2011/0032727 A1* | 2/2011 | Kinder et al. | 362/606 |
| 2011/0210921 A1 | 9/2011 | Lee et al. | |
| 2012/0020111 A1* | 1/2012 | Chung et al. | 362/607 |
| 2012/0026430 A1 | 2/2012 | Chen et al. | |
| 2013/0093980 A1* | 4/2013 | Goto et al. | 349/65 |

FOREIGN PATENT DOCUMENTS

| | | |
|---|---|---|
| EP | 1341030 | 9/2003 |
| JP | 2002-098960 | 4/2002 |
| JP | 2004-199882 | 7/2004 |

OTHER PUBLICATIONS

Vikuiti (TM) Brightness Enhancement Film (BEF) III-10T.
U.S. Appl. No. 13/304,908, Light Guide Apparatus, filed Oct. 28, 2011, Lee et al.
Office Action; Canadian Application No. 2,820,819; Aug. 27, 2014.
Office Action, Canadian Application No. 2,820,819; Apr. 17, 2015.

* cited by examiner

*Primary Examiner* — Donald Raleigh
(74) *Attorney, Agent, or Firm* — Ridout & Maybee LLP

(57) ABSTRACT

A backlight module for illuminating a display is described. The backlight module may be provided in an electronic device along with a light source for illuminating an LCD display. The backlight module includes a diffuser, a light guide having a top surface and a bottom surface, a reflector, and a prism structure positioned between the light guide bottom surface and the reflector. The prism structure has a plurality of prisms extending towards the light guide. The prism structure may include a film or a top portion of the reflector having a plurality of prisms extending towards the light guide.

16 Claims, 11 Drawing Sheets

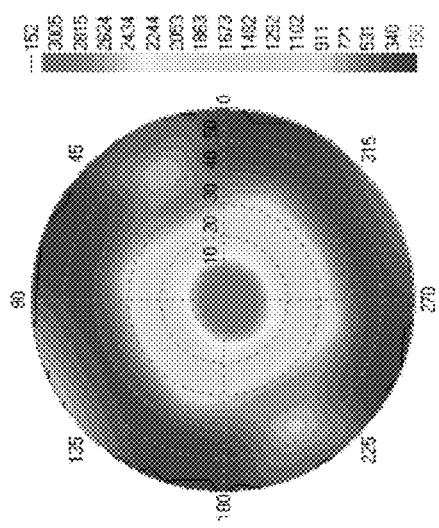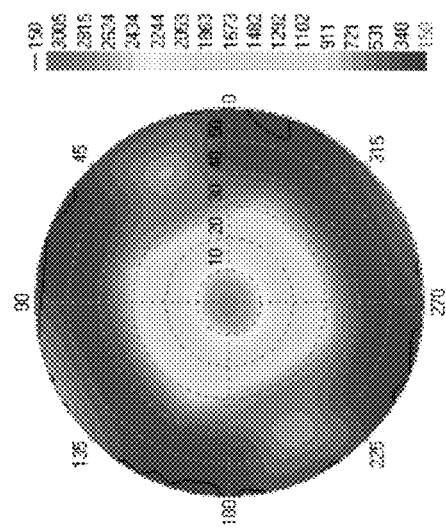
FIG. 10B
FIG. 10C

BACKLIGHT MODULE HAVING A PRISIM REFLECTOR

FIELD OF TECHNOLOGY

The present disclosure relates to backlight modules for liquid crystal displays for illuminating display screens or keypads.

BACKGROUND

Backlight (BL) modules often are used in conjunction with liquid crystal displays (LCD) in electronic devices for the illumination of display screens, keypads, navigation devices, or other components. A backlight module and light source are used to illuminate a component such as an LCD display from behind the display in order to provide improved illumination of components under various light conditions. Poor backlight efficiency can affect the brightness of a display and impact power usage and battery life in the electronic device.

BRIEF DESCRIPTION OF THE DRAWINGS

Embodiments of the present disclosure will now be described, by way of example only, with reference to the attached Figures, wherein:

FIGS. 10(b) and (c) illustrate, respectively, conoscopic plots for a conventional backlight module and a backlight module according to an example embodiments.

DETAILED DESCRIPTION

Figure 1:
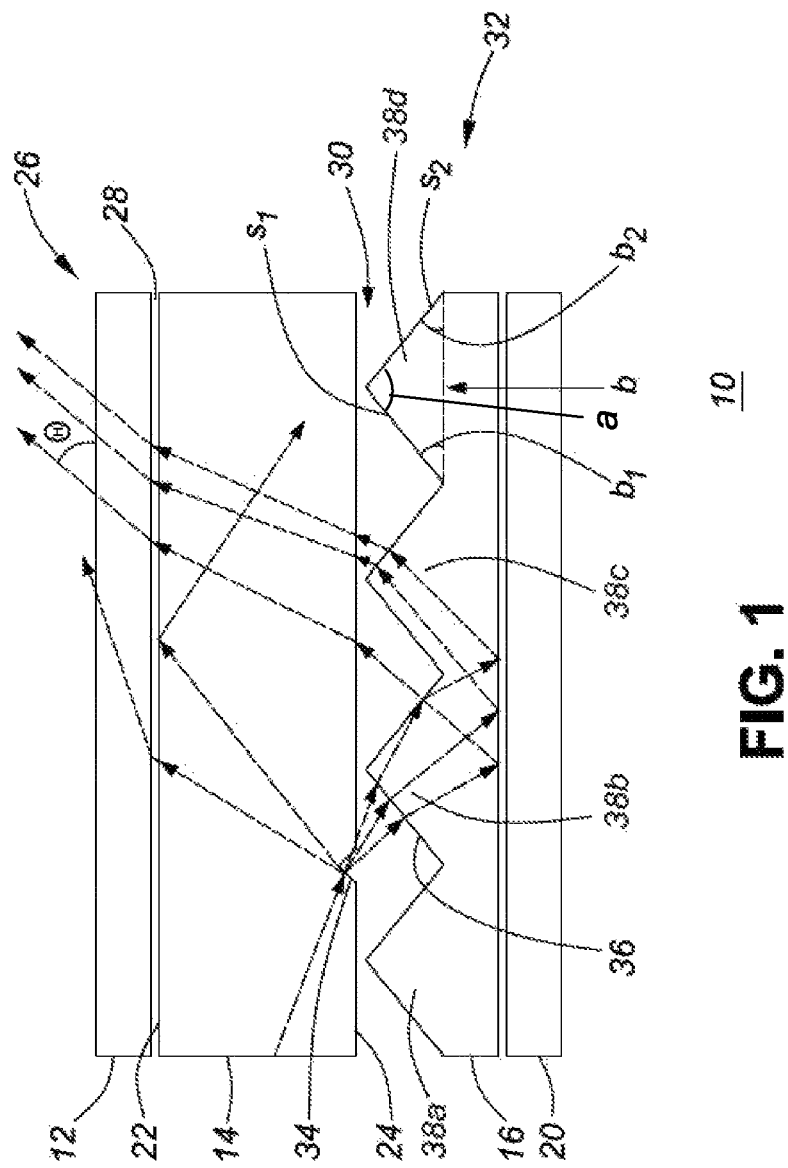
FIG. 1 is a schematic cutaway view of components of a backlight module according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example embodiment there is provided a backlight module which comprises a diffuser; a light guide having a top surface and a bottom surface, the light guide top surface being adjacent the diffuser; a reflector; and a prism structure positioned between the light guide bottom surface and the reflector. The prism structure has a plurality of prisms extending towards the light guide.

According to another embodiment there is provided an electronic device comprising a backlight module, wherein the backlight comprises a diffuser; a light guide having a top surface and a bottom surface, the light guide top surface being adjacent the diffuser; a reflector; and a prism structure positioned between the light guide bottom surface and the reflector. The prism structure has a plurality of prisms extending towards the light guide. The electronic device includes a light source arranged to supply light to the light guide.

Backlight modules are commonly used in electronic devices to distribute light to a particular point or area. The backlight module may include a light source or it may be located adjacent to a light source in order to provide and distribute light for a display such as an LCD display. The backlight module may be mounted behind or below an LCD component. In some examples, the backlight module and light source provide backlighting for one or more keys, navigation devices or other input devices. In some examples, the backlight module and light source provide light to illuminate portions of a device bezel or any other component of the device. In some examples, the backlight module and light source may provide light to be emitted from an aperture of the device. In some examples, the light guide may distribute light for any combination of uses. The angle of light emitted from a backlight module affects the brightness of the display element as light emitted at wide angles typically is not received by a user facing the display element. In some embodiments, light output an angle of 90 degrees, +/−35 degrees, from a front surface of the backlight module and display element provides improved brightness of the display element for a user.

Embodiments of the present disclosure may be applied to any backlight module with a light guide and a reflector. Embodiments of the present disclosure may be applied to electronic devices including but not limited to mobile phones, tablet or laptop computers, personal media players, gaming devices, imaging devices, e-readers and GPS devices. Embodiments of the present disclosure also may be applied to devices such as televisions, monitors, signs, dashboards, control panels, or keyboards. The present disclosure may be applied to any other backlight application and is not necessarily limited to the examples described herein.

FIG. 1 illustrates a backlight module 10, such as a backlight module for a liquid crystal display (LCD), also referred to herein as a BL module or LCD BL module, according to one embodiment of the present disclosure. The BL module 10 is comprised of a number of layers or planar structures. In one embodiment, the BL module includes a diffuser 12, a light guide 14, a prism structure 16 and a reflector 20. The diffuser 12, the light guide 14, the prism structure 16 and the reflector 20 typically comprise planar structures, cross-sections of which are represented in FIG. 1. The light guide 14 has a top surface 22 and a bottom surface 24. The top surface 22 of the light guide 14 is adjacent and below the diffuser 12. The prism structure 16 is positioned between the bottom surface 24 of the light guide 14 and the reflector 20.

The BL module 10 may include a frame, tape and other mechanical and electrical components (not shown) for assembling, mounting and connecting the BL module 10 to a circuit board or frame of an electronic device. The BL module 10 typically is located below a liquid crystal display (LCD) or other display elements (not shown) such that light emitted from the top 26 of the BL module 10 illuminates the display.

In one embodiment, the diffuser 12 comprises a film which internally reflects some incident light rays so that light exiting the diffuser 12 and BL module 10 is scattered and provides more uniform lighting for a display element. The light guide 14 comprises a layer of optical material, such as acrylic resin or plastic configured to diffuse light from a light source. The example light guide 14 in FIG. 1 is illustrated as a plate or panel which, for example, may provide backlighting to a display. However, the example embodiments described in the present disclosure may be applied to any shape or type of light guide 14 including but not limited to wedge light guides. In some embodiments, the BL module 10 includes one or more light sources (not shown in FIG. 1) or one or more light sources may be provided adjacent the BL module 10. In some embodiments, one or more light sources are provided adjacent a side of the light guide 14 to provide an edge-lit display.

In one embodiment, as light enters the light guide 14 from a light source adjacent the left side of the light guide 14, as illustrated in FIG. 1, some light incident at the interface 28 between the light guide 14 and the upper part of the backlight module 10 is refracted and emitted from the top surface 22 of the light guide 14. Light is also propagated from the light source through the light guide 14 through total internal reflection (TIR) within the light guide 14 according to Snell's law and Fresnel's equations. Light incident at the interface 30 between the light guide 14 and a bottom portion 32 of the backlight module 10 also may be refracted and emitted from the bottom surface 24 of the light guide 14 or may be reflected within the light guide 14. In some embodiments, light is emitted from the light guide 14 towards the diffuser 12 and the top 26 or light-emitting side of the backlight module 10 as a result of a pattern of extraction points or elements in the top of the light guide 14, the bottom of the light guide 14, or in both the top and bottom of the light guide 14. An example extraction element 34 is represented in FIG. 1.

As described above, light is also emitted or escapes from the bottom of the light guide 14. The reflector 20 is typically a flat layer provided below the light guide 14 to reflect or redirect light emitted from the bottom of the light guide 14 back towards the light guide 14 and to the top 26 of the backlight module 10. The reflector 20 may be comprised of a multi-layer plastic with a reflective film such as the 3M™ Enhanced Specular Reflector (ESR); a metal coating such as silver or aluminium on a polyethylene terephthalate (PET) substrate; or a white material such as $TiO_2$ (titanium dioxide) or $BaSO_4$ (barium sulfate), or other suitable material having a high refractive index.

In one embodiment, the prism structure 16 is positioned between the light guide bottom surface 24 and the reflector 20. The prism structure 16 may be assembled with the light guide 14, the reflector 20 and other components of the backlight module 10 with a frame (not shown). In other embodiments, the prism structure 16 is laminated to the reflector 20 using an optically clear adhesive (OCA). The prism structure 16 comprises a film of an acrylic resin material or polyethylene terephthalate (PET) which allows light to pass through the prism structure 16. In one embodiment, the prism structure 16 has an index of refraction of 1.4 to 1.6. Light which passes through the prism structure 16 may be reflected by the reflector 20 and pass back through the prism structure 16 to the light guide 14. As light from the light guide 14 crosses the interface 36 at the prism structure 16, the light is refracted by the prism structure 16 and then reflected by the reflector 20. Light is again refracted as it passes through the prism structure 16 and interface 36 and as it, passes the interface 30 and the light guide 14.

The prism structure 16 is configured to change the angle of light incident at the reflector 20 and the angle of light re-entering the light guide 14 in order to affect or control the angle of light θ emitted from the top surface 26 of the BL module 10. In one embodiment, the prism structure 16 is configured to increase the amount of light emitted from the top 26 of the BL module 10 at angles between 55 to 125 degrees, relative to the top surface of the BL module 10, in order to increase the brightness of a display element located above the BL module 10. By changing the angle of light re-entering the light guide 14 from the reflector 20, the prism structure 16 also reduces the amount of reflection and total internal reflection between the bottom surface 24 of the light guide 14 and the reflector 20. The sizes, angles and configurations of the prisms 38$a,b,c,d$ may be varied depending on a number of factors including but not limited to the indexes of refraction of the light guide 14, the prism structure 16 and any material or substance between the light guide 14 and the prism structure 16, as well as the material of the prism structure 16, the reflector 20, the material and configuration of the light guide 14, and the pattern of extraction points or elements 34 in the light guide 14.

In some embodiments, the prism structure 16 comprises a plurality of prisms 38$a,b,c,d$ in a top portion of the structure 16 which extend upwardly towards the light guide 14. In one embodiment, the prisms 38$a,b,c,d$ comprise strips or channels across at least a portion of the planar prism structure 16. In other embodiments, the structure 16 includes other shapes (not shown) configured to change and redirect the angles of light entering the bottom of the light guide 14, such as rectangular or cylindrical channels, a pattern of spherical or triangular structures, or an irregular arrangement of such structures. In some embodiments, an air gap is provided between the light guide 14 and the prism structure 16 or between the light guide 14 and at least a portion of the prism structure 16. Light is refracted as it travels through the interface between the light guide 14 and the air gap, and then again as it travel between the air gap and the interface 36 of the prism structure 16. In some embodiments, an air gap is provided between the prism structure 16 and the reflector 20.

Figure 2:
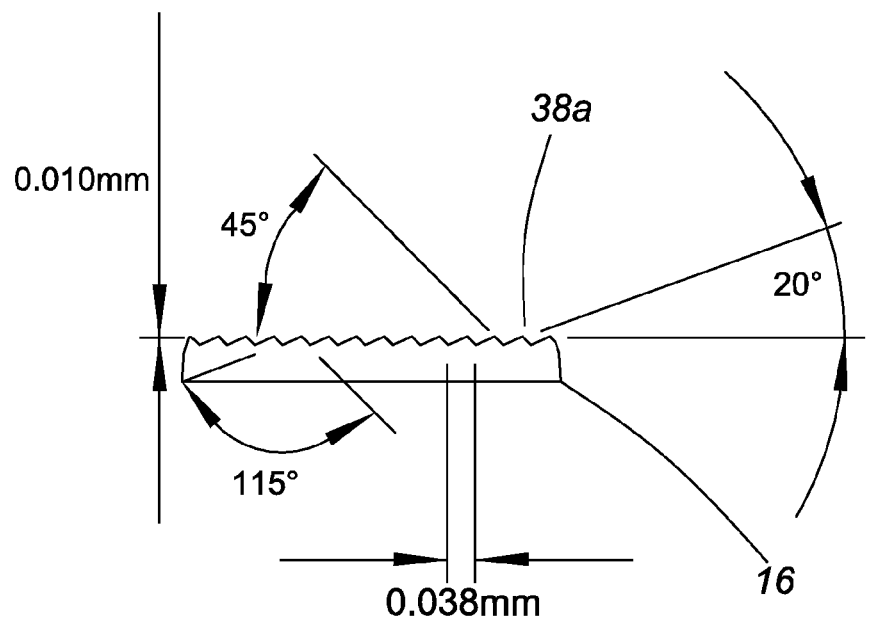
FIGS. 2 and 3 show detailed views of prisms of the backlight module according to the example embodiment of FIG. 1.
Figure 3:
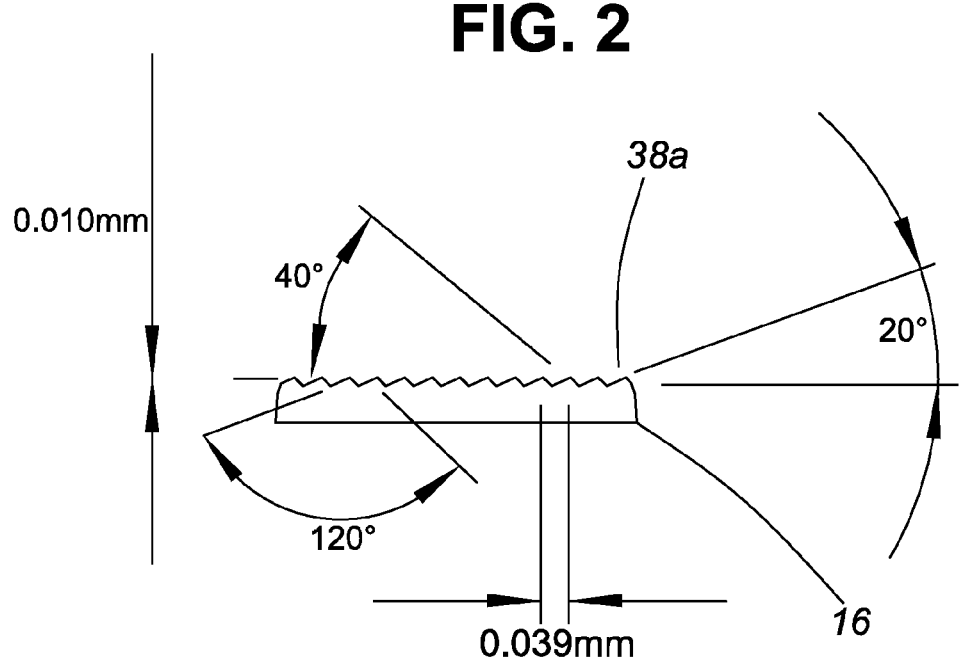

As illustrated in FIGS. 1, 2, and 3, the bases of the prisms 38$a,b,c,d$ may be triangular and may be asymmetrically shaped such as oblique or scalene triangles. In some embodiments, the apex angle a of the prisms 38$a,b,c,d$ may be larger than the base angles $b_1$, $b_2$ and base angle $b_2$ may be 1.5 to 4 times larger than base angle $b_1$. The angles, size and pitch of the prisms 38$a,b,c,d$ are configured depending on the material of the prism structure 16, the reflector 20 and the distance between the prism structure 16 and the light guide 14. In the embodiment shown in FIG. 2, the prism 38$a$ has a prism or apex angle of 115 degrees and base angles $b_1$ and $b_2$ of 20 degrees and 45 degrees. The prism has an altitude or height of 0.01 mm and the prism structure 16 has an overall height of 0.06 mm. The prism pitch in this embodiment is 0.038 mm. In the embodiment shown in FIG. 3, the prism 38$a$ has a prism or apex angle of 120 degrees and base angles $b_1$ and $b_2$ of 20 and 40 degrees. The prism has an altitude or height of 0.01 mm and the prism structure 16 has an overall height of 0.06 mm. The prism pitch in this embodiment is 0.039 mm. In some embodiments, with light entering the BL module 10 at one side of the light guide 14, the prisms 38$a,b,c,d$ are asymmetrically shaped with a base b and two sides $s_1$, $s_2$. The prisms 38a,b,c,d are positioned with the longer side $s_1$ facing generally towards the side of the light guide 14 at which light enters from the light source.

Figure 4:
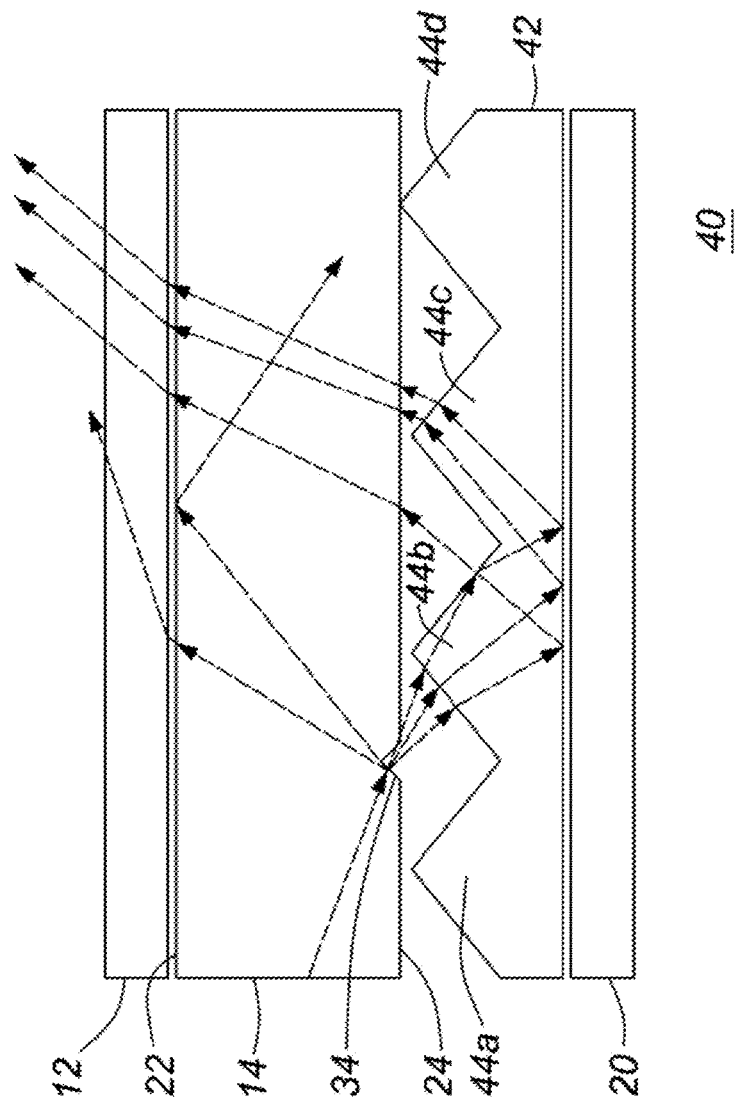
FIG. 4 is a schematic cutaway view of components of a backlight module according to another example embodiment.

FIG. 4 illustrates a backlight module 40 according to another embodiment of the present disclosure. The BL module 40 includes a diffuser 12, a light guide 14 and a reflector 20 as described above. The BL module 40 includes a prism structure 42 similar to the prism structure 16 described above, which is configured with one or more prisms 44a,b,c,d in a top portion of the prism structure 42. In this embodiment, apexes of some of the prisms 44a,b,c,d, as illustrated for prism 44d, contact the bottom surface 24 of the light guide 14 to separate the bottom surface 24 of the light guide 14 and prisms 44a,b,c in the prism structure 42. In one embodiment, the separation between the light guide 14 and prism structure 42 comprises an air gap. In another embodiment, one or more spacer elements (not shown) may be provided in the BL module 40 to create a separation between the bottom surface 24 of the light guide 14 and prisms in a prism structure. The spacers may be provided at outer edges of the prism structure.

Figure 5:
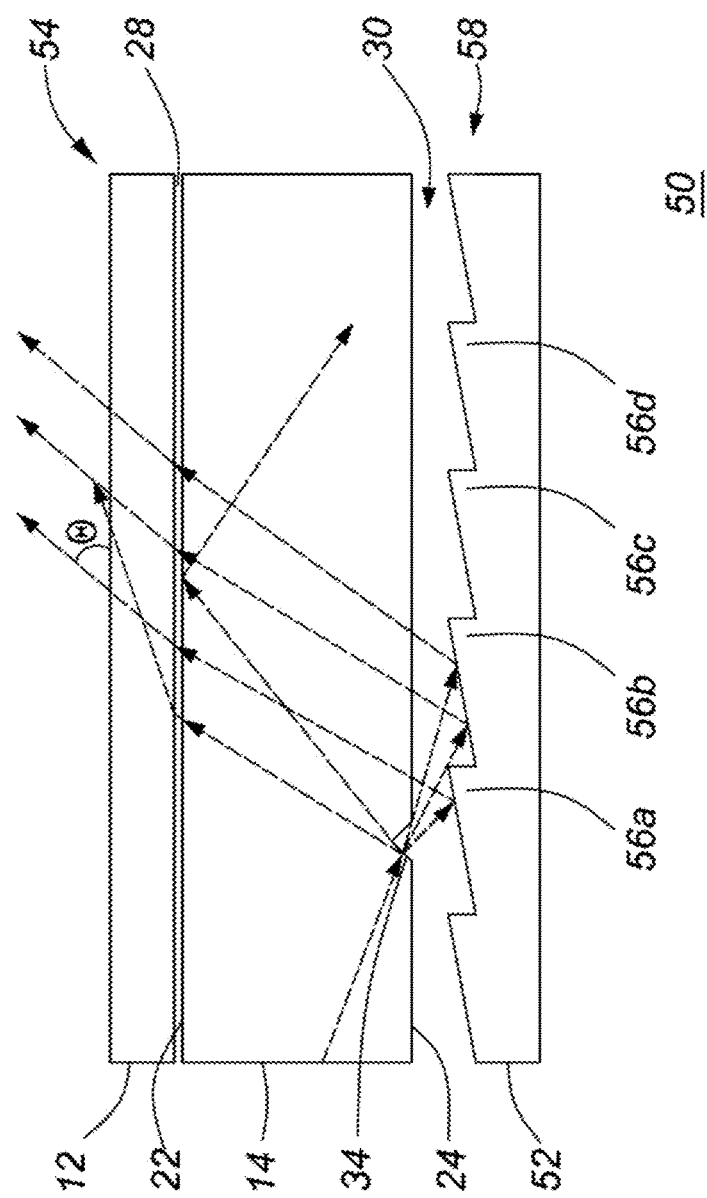
FIG. 5 is a schematic cutaway view of components of a backlight module according to another example embodiment.

FIG. 5 illustrates a backlight module 50 according to another embodiment of the present disclosure. The BL module 50 is comprised of a number of layers or planar structures. In one embodiment, the BL module includes a diffuser 12 and a light guide 14, as described above, and a prism reflector 52. The diffuser 12, the light guide 14 and the prism reflector 52 typically comprise planar structures, cross-sections of which are represented in FIG. 5. The prism reflector 52 is positioned below the bottom surface 24 of the light guide 14.

The BL module 50 may include a frame, tape and other mechanical and electrical components (not shown) for assembling, mounting and connecting the BL module 50 to a circuit board or frame of an electronic device. The BL module 50 typically is located below a liquid crystal display (LCD) or other display elements (not shown) such that light emitted from the top 54 of the BL module 50 illuminates the display.

The prism reflector 52 comprises a reflector including one or more prisms 56a,b,c,d integrated or constructed in a top portion of the prism reflector 52. The prisms 56a,b,c,d extend upwardly towards the light guide 14. The prisms 56a,b,c,d may be formed in the reflector by creating depressions, notches or holes in the reflector. In one embodiment, the prisms 56a,b,c,d comprise strips or channels across at least a portion of a planar prism reflector 52. In other embodiments, the reflector 52 includes other shapes (not shown) configured to change and redirect the angles of light entering the bottom of the light guide 14, such as rectangular or cylindrical channels, a pattern of spherical or triangular structures, or an irregular arrangement of such structures. In some embodiments, an air gap is provided between the light guide 14 and the prism reflector 52 or between the light guide 14 and at least a portion of the prism reflector 52. Light is refracted as it travels through the interface 58 between the light guide 14 and the air gap, and then again as it is reflected and travels between the air gap and the interface 58 toward the top 54 of the BL module 50.

A layer of reflective material is placed on the top surfaces of the prisms 56a,b,c,d to reflect or redirect light emitted from the bottom of the light guide 14 back towards the light guide 14 and to the top of the backlight module 10. The reflective material may comprise a multi-layer plastic with a reflective film such as the 3M™ Enhanced Specular Reflector (ESR); a metal coating such as silver or aluminium on a polyethylene terephthalate (PET) substrate; or a white material such as TiO2 (titanium dioxide) or BaSO4 (barium sulfate), or other suitable material having a high refractive index.

As described above, as light enters and travels through the light guide 14, light is also emitted or escapes from the bottom surface 24 of the light guide 14. Light incident at the interface 30 between the light guide 14 and a bottom portion 58 of the backlight module 50 may be refracted and emitted from the bottom surface 24 of the light guide 14 or may be reflected within the light guide 14. The prism reflector 52 is configured to change the angle of light as it is reflected and passes back through the light guide 14 in order to affect or control the angle of light θ emitted from the top 54 of the BL module 50. In one embodiment, the prism reflector 52 is configured to increase the amount of light emitted from the top 54 of the BL module 50 at angles between 55 to 125 degrees, relative to a top surface of the BL module 50, in order to increase the brightness of a display element located above the BL module 50. By changing the angle of light re-entering the light guide 14 from the prism reflector 52, the amount of reflection and total internal reflection between the bottom surface 24 of the light guide 14 and the prism reflector 52 is reduced. The sizes, angles and configurations of the prisms 56a,b,c,d may be varied depending on a number of factors including but not limited to the indexes of refraction of the light guide 14 and any material or substance between the light guide 14 and the prism reflector 52, as well as the properties of the reflective material of the prism reflector 52, the material and configuration of the light guide 14, and the pattern of extraction points or elements 34 in the light guide 14.

Figure 6:
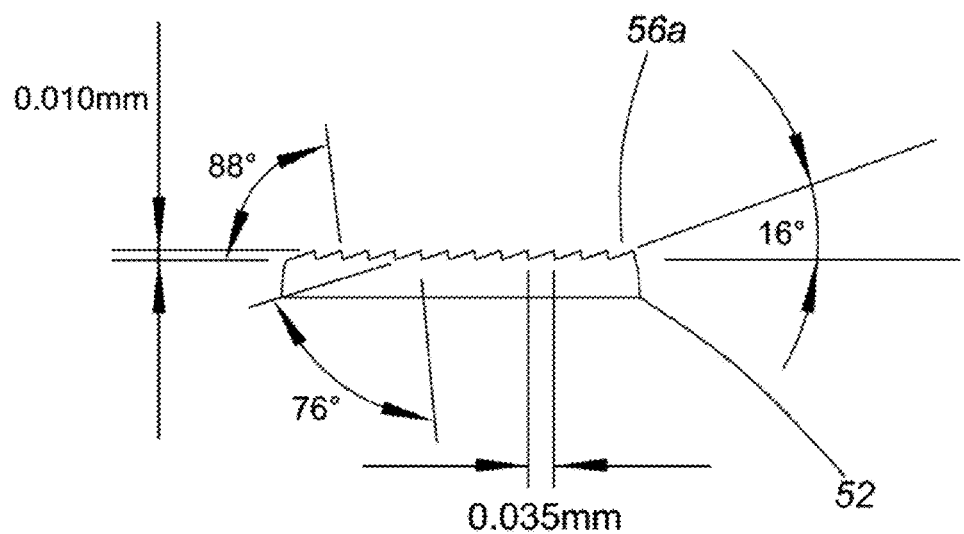
FIG. 6 shows a detailed view of a prism of a backlight module according the embodiment illustrated in FIG. 5.

As illustrated in FIGS. 5 and 6, the bases of the prisms 56a,b,c,d may be triangular and may be asymmetrically shaped such as oblique or scalene triangles. In some embodiments, the apex angle a of the prism may be larger than the base angles $b_1$, $b_2$ and base angle $b_2$ is at least two times larger than base angle $b_1$. The angles, pitch and spacing of the prisms 56a,b,c,d are configured depending on the reflective material of the prism reflector 52 and the distance between the prism reflector 52 and the light guide 14. In the embodiment shown in FIG. 6, the prism 56a has a prism or apex angle of 76 degrees and base angles $b_1$ and $b_2$ of 16 degrees and 88 degrees. The prism has an altitude or height of 0.01 mm and the prism reflector 72 has an overall height of 0.06 mm. The prism pitch in this embodiment is 0.035 mm.

Figure 7:
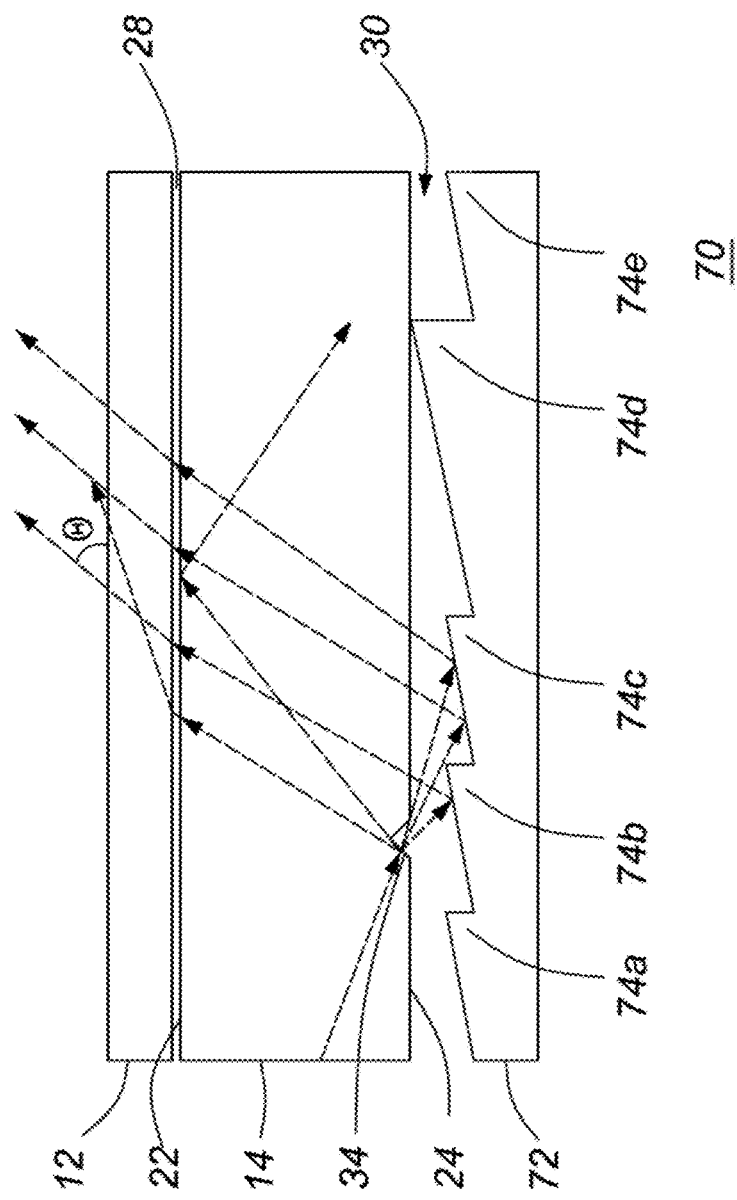
FIG. 7 is a schematic cutaway view of components of a backlight module according to another example embodiment.

FIG. 7 illustrates a BL module 70 according to another embodiment of the present disclosure. The BL module 70 includes a diffuser 12 and a light guide 14 as described above. The BL module 70 includes a prism reflector 72, similar to the prism reflector 52 described above, which is configured with one or more prisms 74a,b,c,d,e in a top portion of the prism reflector 72. In this embodiment, apexes of some of the prisms 74a,b,c,d,e, as illustrated for prism 74d, contact the bottom surface 24 of the light guide 14 to separate the bottom surface 24 of the light guide 14 and prisms 74a,b,c,d in the prism reflector 72. In one embodiment, the separation between the light guide 14 and prism reflector 72 comprises an air gap. In another embodiment, one or more spacer elements (not shown) may be provided in the BL module 70 to create a separation between the bottom surface 24 of the light guide 14 and prisms 74.

Figure 8:
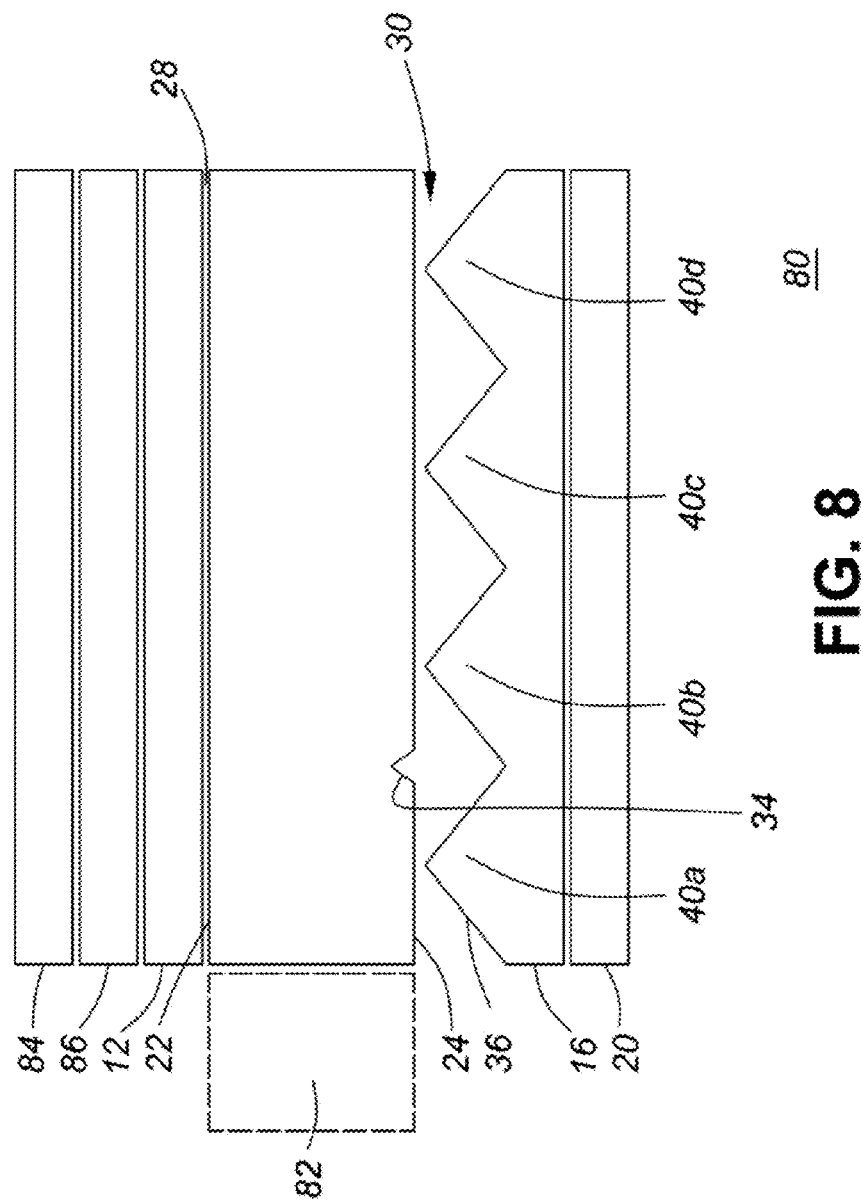
FIG. 8 is a schematic cutaway view of components of a backlight module according to another example embodiment.

FIG. 8 illustrates a backlight module 80 according to further embodiments of the present disclosure. The BL module 80 includes the diffuser 12, the light guide 14, the prism structure 16 and the reflector 20. The top surface 22 of the light guide 14 is adjacent the diffuser 12. The prism structure 16 is positioned between the bottom surface 24 of the light guide 14 and the reflector 20. In some embodiments, one or more light sources 82 may be provided adjacent the BL module 80. In some embodiments, the BL module 80 includes one or more light sources 82 adjacent a side of the light guide 14 to provide an edge-lit display. The light source 82 may be light emitting diodes (LEDs), fluorescent lamps such as cold cathode fluorescent lamps (CCFLs), incandescent bulbs, or any other suitable light source. In one embodiment, the BL module 80 includes at least one brightness enhancement film (BEF). The BEF may include prism patterns to refract light to direct more usable light towards a user viewing a display element. In the embodiment illustrated in FIG. 8, the BL module 80 includes two brightness enhancement films including a top BEF 84 and a bottom BEF 86. The top BEF 84 and bottom BEF 86 may be crossed at 90 degrees to each other. In some embodiments, the BL modules according to the present disclosure increase the performance of BEFs by controlling the angles of light emitted from the diffuser 12 and thus decreasing the recycling of light by the BEF.

Figure 9:
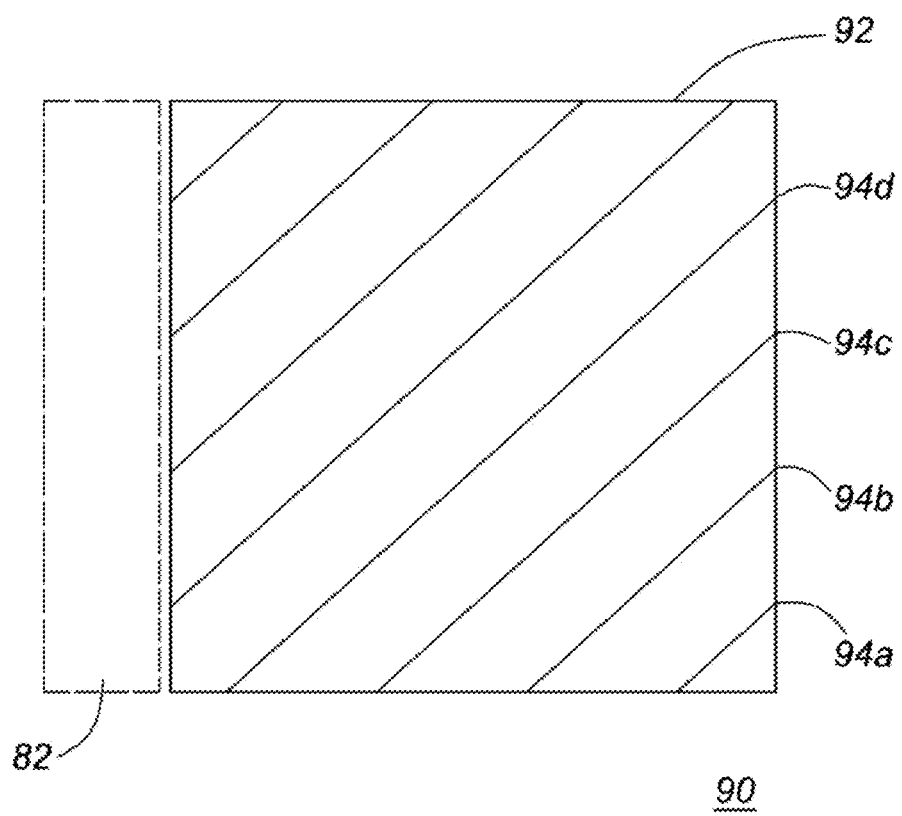
FIG. 9 illustrates a top view of a portion of a backlight module according to another example embodiment.

FIG. 9 illustrates a portion of a backlight module 90 according to further embodiments of the present disclosure. FIG. 9 provides a top view of a light source 82 and a prism structure 92. The prism structure 92 comprises a plurality of prisms 94a,b,c,d in a top portion of the structure 92 which extend upwardly towards the light guide 14. In one embodiment, the prisms 94a,b,c,d comprise strips or channels across at least a portion of the planar prism structure 92 which are arranged at oblique angles across the prism structure 92, rather than strips or channels arranged parallel or at right angles to the edges of the prism structure 92. When prisms 94a,b,c,d are provided at an oblique angle, optical interference and Moiré effects may be reduced. The prisms 94a,b,c,d also may be provided with irregular sizes, non-uniform spacing or with a combination of irregular sizes and non-uniform spacing in order to reduce optical interference and Moiré effects. In other embodiments, the structure 92 includes other shapes (not shown) configured to change and redirect the angles of light entering the bottom of the light guide 14, such as rectangular or cylindrical channels configured at oblique angles relative to the edge of the prism structure 92. In another embodiment (not shown), a plurality of prisms is configured in a prism reflector as described above, with the plurality of prisms comprising strips or channels across at least a portion of the prism reflector which are arranged at oblique angles across the prism reflector, rather than strips or channels arranged parallel or at right angles to the edges of the prism reflector. The plurality of prisms also may be provided with irregular sizes, non-uniform spacing or with a combination of irregular sizes and non-uniform spacing in order to reduce optical interference and Moiré effects.

It will be appreciated that other BL modules according to embodiments of the present disclosure may be provided by incorporating a light source 82, one or more BEFs 84, 86, or both a light source 82 and one or more BEFs 84, 86, with the diffuser 12, light guide 14, and prism structures 16, 42 and reflector 20, or with the diffuser 12, light guide 14, and prism reflectors 52, 72, as described above and illustrated in FIGS. 1 to 7.

Figure 10A:
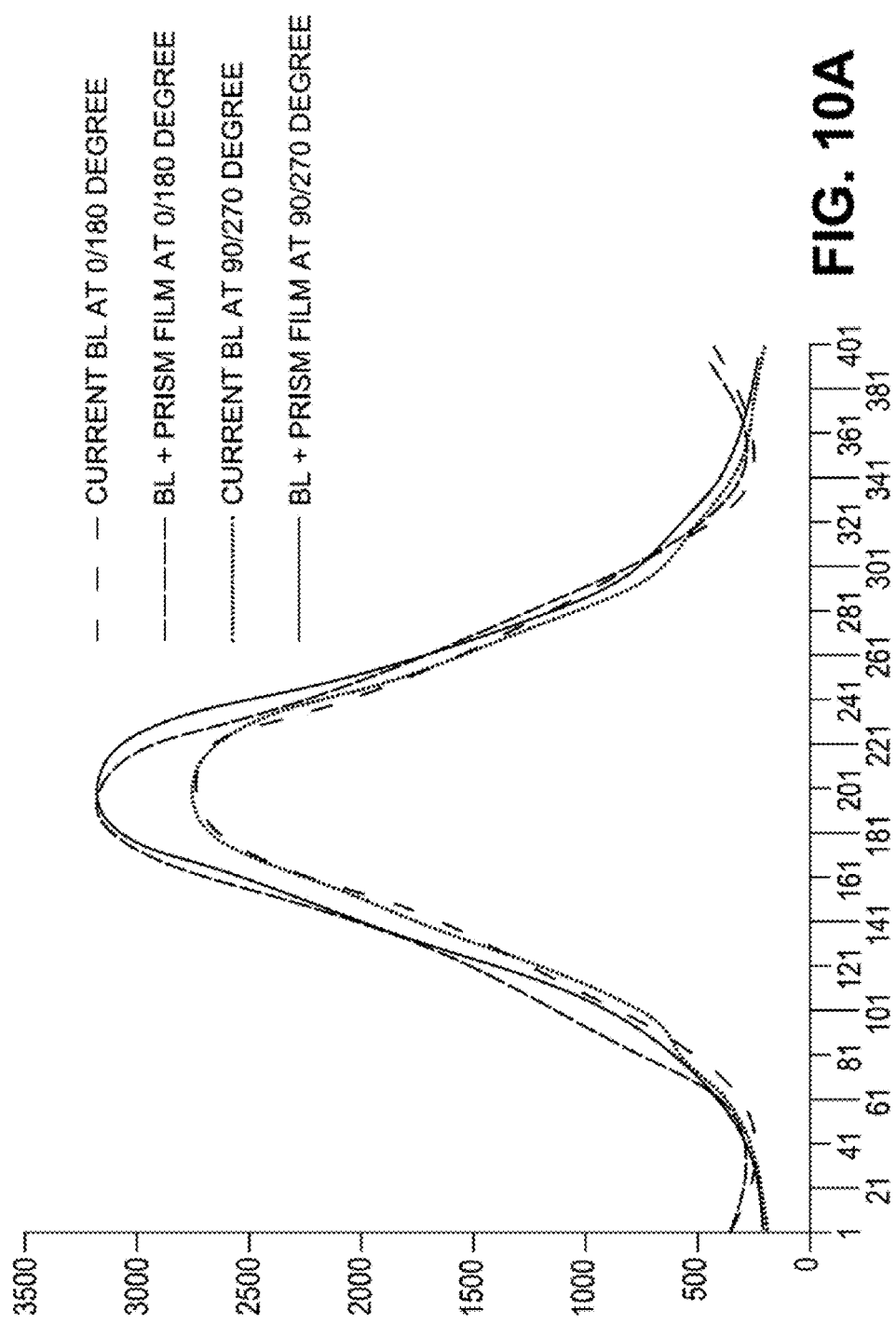
FIG. 10(a) is a sample brightness distribution diagram when light is incident on a backlight module according to an example embodiment.

FIGS. 10(a), (b) and (c) illustrate sample luminance and test results for a backlight module according to embodiments of the present disclosure. FIG. 10(a) illustrates a sample brightness distribution diagram when light is incident on a backlight module 10 according to an example embodiment. The solid lines in FIG. 10(a) represents luminance of a conventional backlight module and the dotted lines generally above the solid lines represent luminance of a backlight module 10. In some embodiments, luminance may be increased by about 15% with a backlight module according to the present disclosure.

FIGS. 10 (b) and (c) illustrate, respectively, conoscopic plots for a backlight module 10 according to an example embodiment and for a conventional backlight module. In some embodiments, luminance may be increased by about 15% with a backlight module according to the present disclosure.

Figure 11:
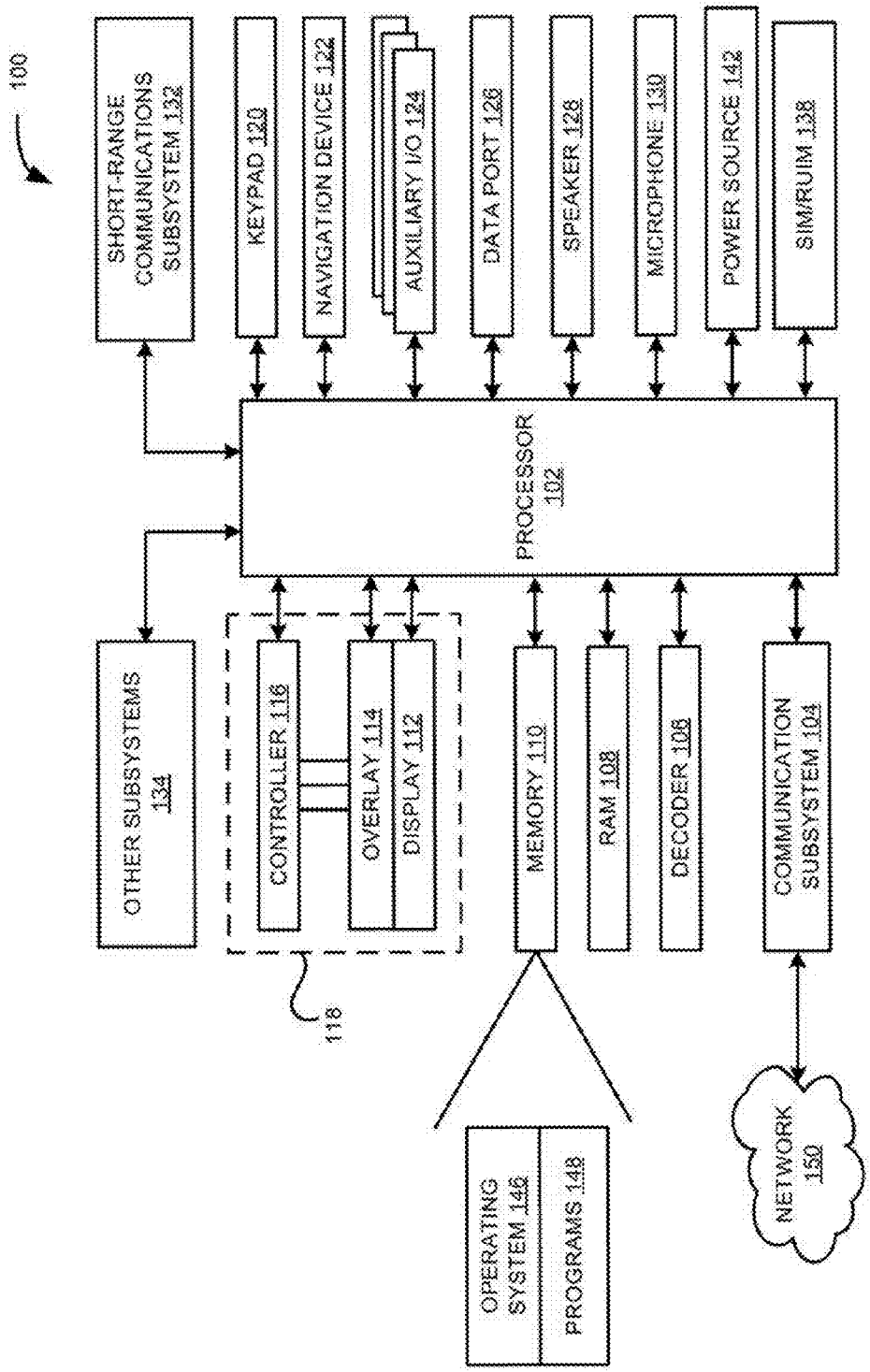
FIG. 11 is a simplified block diagram of components including internal components of an electronic device according to an example embodiment.

Reference is made to FIG. 11, which illustrates in block diagram form, an electronic device 100 to which example embodiments described in the present disclosure can be applied. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 118, one or more keys or buttons or a keypad 120, a navigation device 122, one or more auxiliary input/output (I/O) subsystems 124, a data port 126, a speaker 128, a microphone 130, short-range communications subsystem 132, and other device subsystems 134. To identify a subscriber for network access, the electronic device 100 uses a Subscriber Identity Module or a Removable User Identity Module (SIM/RUIM) card 138 for communication with a network, such as the wireless network 150. Alternatively, user identification information may be programmed into memory 110.

The auxiliary I/O subsystems 124 could include other input devices such as one or more control keys, a keyboard or keypad, navigational tool (input device), or both. The navigational tool may be a depressible (or clickable) joystick such as a depressible optical joystick, a depressible trackball, a depressible scroll wheel, or a depressible touch-sensitive trackpad or touchpad. The other input devices could be included in addition to, or instead of, the touch-sensitive display 118, depending on the embodiment.

It will be appreciated that the electronic controller 116 of the touch-sensitive display 118 need not be physically integrated with the touch-sensitive overlay 114 and display 112. User-interaction with a graphical user interface (GUI) is performed through the touch-sensitive overlay 114. The GUI displays user interface screens on the touch-sensitive display 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a mobile device, is displayed on the touch-sensitive display 118 via the processor 102.

One or more backlight modules and light sources (not shown) may provide backlighting or illumination to the display 112, buttons or keypad 120, navigation device 122, other input devices, the device bezel, apertures, or any combination thereof. In some example embodiments, the one or more backlight modules and light sources may be controlled by a controller, such as the electronic controller 116, or by the processor 102 to adjust the intensity, colour, lighting effect, or any other attribute of the light provided by the backlight modules and light sources.

The electronic device 100 includes an operating system 146 and software programs or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

While the embodiments described herein are directed to particular implementations of light guide apparatuses, it will be understood that modifications and variations may occur to those skilled in the art having read the present disclosure. All such modifications and variations are believed to be within the sphere and scope of the present disclosure.

The invention claimed is:

1. A backlight module comprising:
   a planar light diffuser;
   a planar light guide located directly below the light diffuser;
   a prism structure located directly below the light guide and having a plurality of asymmetric triangular prisms extending upwardly towards a bottom surface of the light guide, the prism structure defining channels extending perpendicular to light incident at an edge of the light guide, each asymmetric triangular prism having a first base angle smaller than a second base angle, wherein an air gap is defined between at least some regions of a top surface of the prism structure and the bottom surface of the light guide; and
   a planar reflector located directly below the prism structure.

2. The backlight module of claim 1 wherein the prism structure comprises a film, a top portion of the film including the plurality of prisms.

3. The backlight module of claim 1 wherein apexes of some of the prisms contact the light guide bottom surface and apexes of some of the prisms are spaced apart from the light guide bottom surface.

4. The backlight module of claim 1, wherein at least one of the plurality of prisms has an apex angle larger than each of first and second base angles of the at least one prism and wherein the second base angle is 1.5 to 4 times larger than the first base angle.

5. The backlight module of claim 1 further comprising at least one light source arranged to supply light to the light guide, wherein the prism structure is configured to change the angle of light reflected by the reflector to control the angle of light emitted from the top surface of the light guide.

6. The backlight module of claim 5 wherein the prism structure is configured to change the angle of light reflected by the reflector to provide emitted light from the top surface of the light guide at an angle of 55 to 125 degrees.

7. The backlight module of claim 1 further comprising at least one spacer separating a top of the prism structure from the bottom surface of the light guide.

8. An electronic device comprising
   a backlight module including:
     a planar light diffuser;
     a planar light guide located directly below the light diffuser;
     a prism structure located directly below the light guide and having a plurality of asymmetric triangular prisms extending upwardly towards the bottom surface of the light guide, the prism structure defining channels extending perpendicular to light incident at an edge of the light guide, each asymmetric triangular prism having a first base angle smaller than a second base angle, wherein an air gap is defined between at least some regions of a top surface of the prism structure and a bottom surface of the planar light guide; and
     a planar reflector located directly below the prism structure, wherein an air gap is defined between the prism structure and the planar reflector;
   a light source arranged to supply light to the edge of the light guide.

9. The electronic device of claim 8 further comprising a display or a keypad, wherein the backlight module and light source provide backlighting for the display or for the keypad.

10. The backlight module of claim 1 wherein for each of the plurality of prisms a longer side of the prism, between the first base angle and an apex angle, faces light incident at the edge of the light guide.

11. The backlight module of claim 4 wherein each of the plurality of prisms has an apex angle larger than each of the first and second base angles of the prism, with the second base angle being 1.5 to 4 times larger than the first base angle, and wherein a longer side of the prism, between the first base angle and the apex angle, faces light incident at the edge of the light guide.

12. The backlight module of claim 1 wherein the bottom surface of the light guide comprises a pattern of extraction elements.

13. The electronic device of claim 8 wherein for each of the plurality of prisms, a longer side of the prism, between the first base angle and an apex angle, faces light incident at the edge of the light guide.

14. The backlight module of claim 1 wherein the reflector comprises a reflective material placed on a surface of the plurality of asymmetric triangular prisms.

15. A backlight module comprising:
   a planar light diffuser;
   a brightness enhancement film located directly above the light diffuser;
   a planar light guide located directly below the light diffuser;
   a prism structure located directly below the light guide and having a plurality of asymmetric triangular prisms extending upwardly towards a bottom surface of the light guide, the prism structure defining channels extending perpendicular to light incident at an edge of the light guide, each asymmetric triangular prism having a first base angle smaller than a second base angle, wherein an air gap is defined between at least some regions of a top surface of the prism structure and a bottom surface of the light guide; and a planar reflector located directly below the prism structure.

16. The backlight module of claim 15, further comprising at least two brightness enhancement films located directly above the light diffuser, wherein the at least two brightness enhancement films comprises a top brightness enhancement film oriented in a first direction, and a bottom brightness enhancement film oriented in a second direction orthogonal to the first direction.

* * * * *